(12) United States Patent
Trott et al.

(10) Patent No.: US 10,592,767 B2
(45) Date of Patent: Mar. 17, 2020

(54) INTERPRETABLE COUNTING IN VISUAL QUESTION ANSWERING

(71) Applicant: salesforce.com, inc., San Francisco, CA (US)

(72) Inventors: Alexander Richard Trott, San Francisco, CA (US); Caiming Xiong, Mountain View, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 70 days.

(21) Appl. No.: 15/882,220

(22) Filed: Jan. 29, 2018

(65) Prior Publication Data

US 2019/0130206 A1 May 2, 2019

Related U.S. Application Data

(60) Provisional application No. 62/578,379, filed on Oct. 27, 2017.

(51) Int. Cl.
 *G06K 9/00* (2006.01)
 *G06K 9/46* (2006.01)
 (Continued)

(52) U.S. Cl.
 CPC ......... *G06K 9/46* (2013.01); *G06F 16/3329* (2019.01); *G06K 9/00* (2013.01); *G06N 3/0445* (2013.01); *G06N 5/04* (2013.01); *G06T 2210/12* (2013.01)

(58) Field of Classification Search
 None
 See application file for complete search history.

(56) References Cited

U.S. PATENT DOCUMENTS 10,198,671 B1 * 2/2019 Yang .................. G06T 11/60
10,282,663 B2  5/2019 Socher et al.
(Continued)

OTHER PUBLICATIONS

Johnson, Justin, Andrej Karpathy, and Li Fei-Fei. "Densecap: Fully convolutional localization networks for dense captioning." Proceedings of the IEEE Conference on Computer Vision and Pattern Recognition. 2016 (Year: 2016).*

(Continued)

*Primary Examiner* — Hadi Akhavannik
(74) *Attorney, Agent, or Firm* — Haynes and Boone, LLP

(57) ABSTRACT

Approaches for interpretable counting for visual question answering include a digital image processor, a language processor, and a counter. The digital image processor identifies objects in an image, maps the identified objects into an embedding space, generates bounding boxes for each of the identified objects, and outputs the embedded objects paired with their bounding boxes. The language processor embeds a question into the embedding space. The scorer determines scores for the identified objects. Each respective score determines how well a corresponding one of the identified objects is responsive to the question. The counter determines a count of the objects in the digital image that are responsive to the question based on the scores. The count and a corresponding bounding box for each object included in the count are output. In some embodiments, the counter determines the count interactively based on interactions between counted and uncounted objects.

20 Claims, 12 Drawing Sheets

(51) Int. Cl.
*G06F 16/332* (2019.01)
*G06N 5/04* (2006.01)
*G06N 3/04* (2006.01)

(56) References Cited

U.S. PATENT DOCUMENTS

| | | | |
|---|---|---|---|
| 10,346,721 | B2 | 7/2019 | Albright et al. |
| 2011/0161076 | A1* | 6/2011 | Davis ................. G06F 3/04842 704/231 |
| 2013/0330008 | A1* | 12/2013 | Zadeh ..................... G06N 7/02 382/195 |
| 2016/0078127 | A1* | 3/2016 | Bhat ..................... G06F 16/338 704/9 |
| 2016/0342895 | A1* | 11/2016 | Gao .................... G06F 17/2881 |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0124432 | A1* | 5/2017 | Chen ................... G06N 3/0454 |
| 2017/0140240 | A1 | 5/2017 | Socher |
| 2018/0082171 | A1 | 3/2018 | Merity et al. |
| 2018/0096219 | A1 | 4/2018 | Socher |
| 2018/0096267 | A1 | 4/2018 | Masekera et al. |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0268287 | A1 | 9/2018 | Johansen et al. |
| 2018/0268298 | A1 | 9/2018 | Johansen et al. |
| 2018/0300400 | A1 | 10/2018 | Paulus |
| 2019/0043201 | A1* | 2/2019 | Strong ................ G06K 9/00993 |
| 2019/0108432 | A1 | 4/2019 | Lu et al. |
| 2019/0108439 | A1 | 4/2019 | Lu et al. |
| 2019/0130248 | A1 | 5/2019 | Zhong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |

OTHER PUBLICATIONS

Ren, Mengye, Ryan Kiros, and Richard Zemel. "Exploring models and data for image question answering." Advances in neural information processing systems. 2015. (Year: 2015).*

Aishwarya Agrawal, Jiasen Lu, Stanislaw Antol, Margaret Mitchell, C. Lawrence Zitnick. Devi Parikh, and Dhruv Batra. VQA: Visual Question Answering. *International Journal of Computer Vision*, 2015.

Peter Anderson, Xiaodong He, Chris Buehler, Damien Teney, Mark Johnson, Stephen Gould, and Lei Zhang. Bottom-Up and Top-Down Attention for Image Captioning and VQA. *CVPR*, 2017.

Jacob Andreas, Marcus Rohrbach, Trevor Darrell, and Dan Klein. Neural module networks in *CVPR* 2016.

Jacob Andreas, Marcus Rohrbach, Trevor Darrell, and Dan Klein. Learning to Compose Neural Networks for Question Answering. In *NAACL*, 2016.

Arjun Chandrasekaran, Deshraj Yadav, Prithvijit Chattopadhyay, Viraj Prabhu, and Devi Parikh. It Takes Two to Tango: Towards Theory of AI's Mind. *arXiv*, 2017.

Prithvijit Chattopadhyay, Ramakrishna Vedantam, Ramprasaath R. Selvaraju, Dhruv Batra, and Devi Parikh. Counting Everyday Objects in Everyday Scenes. in *CVPR*, 2017.

Jifeng Dai, Yi Li, Kaiming He, and Jian Sun. R-FCN: Object Detection via Region-based Fully Convolutional Networks. In *NIPS*, 2016.

Akira Fukui, Dong Huk Park, Daylen Yang, Anna Rohrbach, Trevor Darrell, and Marcus Rohrbach. Multimodal compact bilinear pooling for visual question answering and visual grounding. In *EMNLP*, 2016.

Ross Girshick. Fast R-CNN. In *ICCV*, 2015.

Ross Girsbick, Jeff Donahue, Trevor Darell, and Jitendra Malik. Rich feature hierarchies for accurate object detection and semantic segmentation. In *CVPR*, 2015.

Yash Goyal Tejas Khot, Douglas Summers-Stay, Dhruv Batra, and Devi Parikh. Making the V in VQA Matter: Elevating the Role of Image Understanding in Visual Question Answering. In *CVPR*, 2017.

Kaiming He, Xiangyu Zhang, Shaoqing Ren, and Jian Sun. Deep Residual Learning for Image Recognition. In *CVPR*, 2016.

Sepp Hochreiter and Jurgen Schmidhuber. Long Short-Term Memory. *Neural Computation*, 9(8): 1735-1780, 1997.

Ronghang Hu, Jacob Andreas, Marcus Rohrbach, Trevor Darrell, and Kate Saenko. Learning to Reason: End-to-End Module Networks for Visual Question Answering. In *ICCV*, 2017.

Ilija Ilievski, Shuicheng Yan, and Jiashi Feng. A Focused Dynamic Attention Model for Visual Question Answering. *arXiv*, 2016.

Jin-Hwa Kim, Kyoung-Woon On, Woosang Lim, Jeonghee Kim, Jung-Woo Ha, and Byoung-Tak Zhang. Hadamard Product for Low-rank Bilinear Pooling. In *ICLR*, 2017.

Diederik P. Kingma and Jimmy Ba. Adam: A Method for Stochastic Optimization. *arXiv*. 2017.

Ranjay Krishna, Yuke Zhu, Oliver Groth, Justin Johnson, Kenji Hata, Joshua Kravitz, Stephanie Chen, Yannis Kalantidis, Li-Jia Li, David A. Shamma, Michael S. Bernstein, and Fei-Fei Li. Visual Genome: Connecting Language and Vision Using Crowdsourced Dense Image Annotations. *International Journal of Computer Vision*, 2016.

Victor Lempitsky and Andrew Zisserman. Learning to Count Objects in Images. *NIPS*, 2010.

Tsung-Yi Lin, Michael Maire, Serge Belongie, Lubomir Bourdev, Ross Girshick, James Hays. Pietro Perona, Deva Ramanan, C. Lawrence Zitnick, and Piotr Dollar. Microsoft COCO: Common Objects in Context. In *ECCV*, 2014.

Tsung-Yi Lin. Priya Goyal, Ross Girshick, Kaiming He, and Piotr Dollar. Focal Loss for Dense Object Detection. *ICCV*, 2017.

Jiasen Lu. Caiming Xiong, Devi Parikh, and Richard Socher. Knowing When to Look: Adaptive Attention via a Visual Sentinel for Image Captioning. In *CVPR*, 2016.

Jiasen Lu. Jianwei Yang, Dhruv Batra, and Devi Parikh. Hierarchical Question-Image Co-Attention for Visual Question Answering. In *NIPS*, 2016.

Yuping Luo, Chung-cheng Chiu. Navdeep Jaitly, and Ilya Sutskever. Learning Online Alignments with Continuous Rewards Policy Gradient. In *ICASSP*, 2017.

Mateusz Malinowski and Mario Fritz. A Multi-World Approach to Question Answering about Real-World Scenes based on Uncertain Input. In *NIPS*, 2014.

Volodyrnyr Minh. Adria Puigdomenech Badia, Mehdi Mirza, Alex Graves. Tim Harley. Timothy Lillicrap, David Silver, and Korny Kavukcuoglu. Asynchronous Methods for Deep Reinforcement Learning. In *ICML*, 2016.

Daniel Onoro-Rubio and Roberto J. Lopez-Sastre. Towards perspective-free object counting with deep learning. In *ECCI*, 2016.

Dong Huk Park, Lisa Anne Hendricks, Zeynep Akara. Berm Schiele, Trevor Darrell, and Marcus Rohrbach. Attentive Explanations: Justifying Decisions and Pointing to the Evidence. *arXiv*, 2016.

Romain Paulus. Caimiog Xiong, and Richard Socher. A Deep Reinforced Model for Abstractive Summarization *arXiv*, 2017.

Jeffrey Pennington, Richard Socher, and Christopher Manning. Glove: Global Vectors for Word Representation. EMNLP, pp. 1532-1543, 2014.

Mengye Ren and Richard S. Zemel. End-to-End Instance Segmentation with Recurrent Attention. In *CVPR*, 2017.

Mengye Ren, Ryan Kiros. and Richard Zemel. Exploring Models and Data for Image Question Answering. In *NIPS*, 2015.

Shaoqing Ren, Kaiming He, Ross Girshick, and Jian Sun. Faster R-CNN: Towards Real-Time Object Detection with Region Proposal Networks. In *NIPS*, 2015.

Steven J. Rennie, Etienne Marcheret, Youssef Mroueh, Jarret Ross, and Vaibhava Goel. Self-critical Sequence Training for Image Captioning. In *CVPR*, 2017.

(56) References Cited

OTHER PUBLICATIONS

Olga Russakovsky, Jia Deng, Hao Su, Jonathan Krause. Sanjeev Satheesh, Sean Ma, Zhiheng Huang, Andrej Karpathy, Aditya Khosla, Michael Bernstein, Alexander C. Berg, and Li Fei-Fei. ImageNet Large Scale Visual Recognition Challenge. *International Journal of Computer Vision*. 2015.
Santi Segui, Oriol Pujol, and Jordi Vitria. Learning to count with deep object features. In *CVPRW*, 2015.
Kevin J. Shih, Saurabh Singh, and Derek Hoiem. Where To Look: Focus Regions for Visual Question Answering In *CVPR*, 2015.
Richard Socher, Andrej Karpathy, Quoc V Le, Christopher D. Manning, and Andrew Y. Ng. Grounded Compositional Semantics for Finding and Describing Images with Sentences. In *TACL*, 2014.
Damien Teney, Lingqiao Liu, and Anton van den Hengel. Graph-Structured Representations for Visual Question Answering. *arXiv*. 2016.
Aaron van den Oord, Nal Kalchbrenner, Oriol Vinyals. Lasse Espeholt, Alex Graves, and Koray Kavukcuoglu. Conditional Image Generation with PixelCNN Decoders. in *NIPS*, 2016.
R J Williams. Simple statistical gradient-following methods for connectionist reinforcement learning. *Machine Learning*, 8:229-256, 1992.
Ronald J. Williams and Jing Peng. Function Optimization using Connectionist Reinforcement Learning Algorithms. *Connection Science*, 3(3):241-268, 1991.
Caiming Xiong, Stephen Merity, and Richard Socher. Dynamic Memory Networks for Visual and Textual Question Answering. In *ICML*, 2016.
Huijuan Xu and Kate Saenko. Ask, Attend and Answer: Exploring Question-Guided Spatial Attention for Visual Question Answering. In *ECCV*, 2015.
Zichao Yang. Xiaodong He, Jianfeng Gao. Li Deng. and Alex Smola. Stacked Attention Networks for Image Question Answering. In *CVPR*, 2015.
Cong Zhang, Hongsheng Li, Xiaogang Wang, and Xiaokang Yang. Cross-scene crowd counting via deep convolutional neural networks. In *CVPR*, 2015.
Jianming Zhang, Shugao Ma, Mehrnoosh Sameki. Stan Sclaroff. Margrit Betke. Zhe Lin, Xiao-hui Shen, Brian Price, and Radomir Mech. Salient Object Subitizing. *International Journal of Computer Vision*, 2017.
Bolei Zhou. Yuandong Tian. Sainbayar Sukhbaatar, Arthur Szlam, and Rob Fergus. Simple Baseline for Visual Question Answering. *arXiv*, 2015.
Yuke Zhu, Oliver Groth. Michael Bernstein, and Li Fei-Fei. Visual7W: Grounded Question Answering in Images. In *CVPR*, 2015.
Chaubard et al., "CC 224D: Deep Learning for NLP, Lecture Notes: Part 1," Spring 2015. pp. 1-11.
Chaubard et al., "CS 224D: Deep Learning for NLP, Lecture Notes: Part 2," Spring 2015. pp. 1-11.
Chaubard et al., "CS 224D: Deep Learning for NLP, Lecture Notes: Part 3," Spring 2015. pp. 1-11.
Chaubard et al., "CS 224D: Deep Learning for NLP, Lecture Notes: Part 4," Spring 2015. pp. 1-12.
Chaubard et al., "CS 224D: Deep Learning for NLP, Lecture Notes: Part 5," Spring 2015. pp. 1-6.
Li "Deep Reinforcement Learning: A Overview," Proceedings of SAI Intelligent Systems Conference (IntelliSys). London, United Kingdom. Sep. 21-22, 2016. pp. 1-70.

\* cited by examiner

| Model | Accuracy | RMSE |
|---|---|---|
| Guess1 | 33.8 | 3.74 |
| LSTM | 36.8 | 3.47 |
| SoftCount | 50.2 (49.2) | 2.37 (2.45) |
| UpDown | 52.7 (51.5) | 2.64 (2.69) |
| IRLC | 57.7 (56.1) | 2.37 (2.45) |

US 10,592,767 B2

INTERPRETABLE COUNTING IN VISUAL QUESTION ANSWERING

RELATED APPLICATIONS

The present application claims priority to U.S. Provisional Patent Application Ser. No. 62/578,379 filed on Oct. 27, 2017 and entitled "Interpretable Counting in Visual Question Answering," which is incorporated by reference in its entirety.

TECHNICAL FIELD

The present disclosure relates generally to the generation of interpretable counting results for questions related to image content.

BACKGROUND

Visual question answering (VQA) is a benchmark to test for context-specific reasoning about complex images. One aspect of visual question answering is related to the answering of counting questions (also known as "How Many" questions) that are related to identifying distinct scene elements or objects that meet some criteria embodied in the question and counting the objects.

Accordingly, it would be advantageous to have systems and methods for counting the objects in images that satisfy a specified criteria.

In the figures, elements having the same designations have the same or similar functions.

DETAILED DESCRIPTION

Context specific reasoning, including context specific reasoning regarding the content of images, is an important problem in machine intelligence and learning applications. Context specific reasoning may provide valuable information for use in the interpretation of medical images, diagnostic systems, autonomous vehicles, and/or the like. One type of context specific reasoning is the determination of how many (e.g., a count) objects in an image that meet a specified criteria. In addition to determining the count of the number of objects in the image, it may also be useful to have access to additional information allowing the results of the counting to be further verified or interpreted by seeing which objects are counted. The information regarding which objects are counted help identify instances where the count is correct, but for the wrong reasons (e.g., the objects that did not meet the specified criteria are counted and object that met the criteria are not). The information regarding which object is counted may also be useful in identifying regions in the image that are to be further processed. And although the various embodiments described within this disclosure are generally related to answering natural language counting questions (e.g., questions in English) about the content of an image, it is understood that the described embodiments may be adapted to other context-specific reasoning applications, such as those related to video, questions in forms other than natural language, questions provided in audio form, and/or the like.

Figure 1:
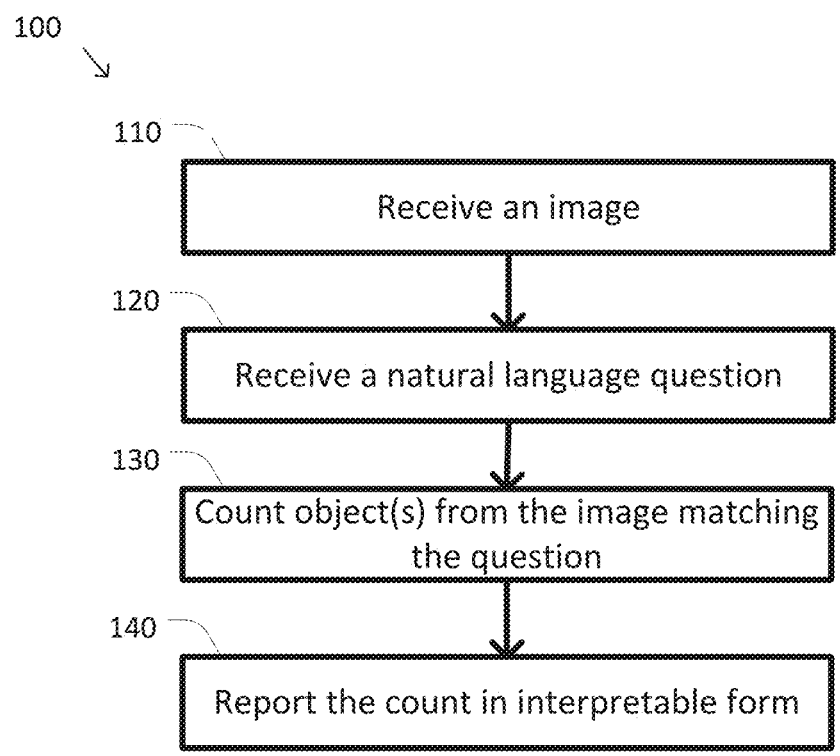
FIG. 1 is a simplified diagram of a method of counting objects in an image according to some embodiments.
Figure 2:
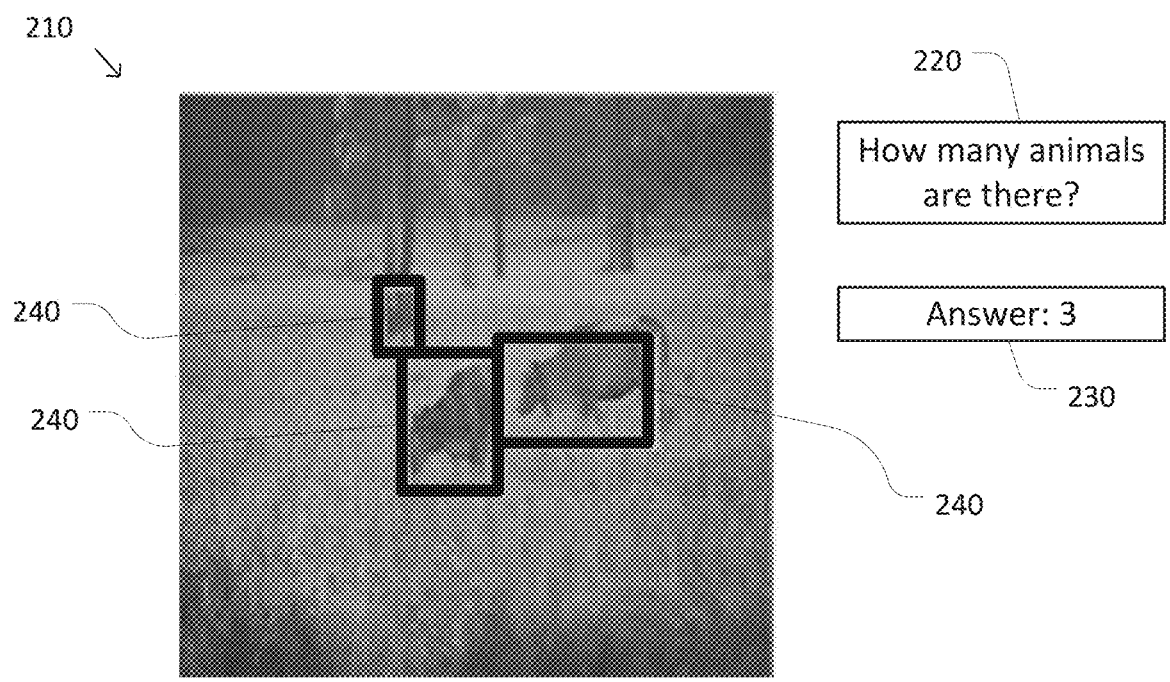
FIG. 2 is a simplified diagram of an image and a counting question according to some embodiments.

FIG. 1 is a simplified diagram of a method of counting objects in an image according to some embodiments. One or more of the processes 110-140 of method 100 may be implemented, at least in part, in the form of executable code stored on non-transitory, tangible, machine-readable media that when run by one or more processors may cause the one or more processors to perform one or more of the processes 110-140. And although FIG. 1 implies an ordering to processes 110-140 it is understood that the processes may be performed in other orders. In some examples, processes 110 and 120 may be performed in any order and/or concurrently. Method 100 is described in the context of FIG. 2, which is a simplified diagram of an image 210 and a counting question 220 according to some embodiments.

At a process 110, an image is received. Image 210 is an example of an image that may be received during process 110. In some examples, the image may be received as a file in an image format, such as GIF, JPEG, bitmap, and/or the like. In some examples, the image may be received from an imaging device, such as a camera, a video camera, and/or the like.

At a process 120, a natural language question is received. In some examples, the question is a counting question, such as question 220, which asks: "How many animals are there?" Other questions may include "how many trees are there?" and/or the like. In some examples, the question may be received as a file in a text-interpretable format, such as text, XML, JSON, a word processing format, and/or the like. In some examples, the question may be typed in by a user, transcribed from an audio sample, and/or the like.

At a process 130, the object(s) from the image matching the question are counted. Specific examples of counting systems and methods are described in further detail below.

At a process 140, the results of the counting are reported and/or output in interpretable form. Counting result 230 is an example of a reported count. In some examples, the count is reported as a numeric value, in textual form, as audio output, and/or the like. Additional information regarding the results of the counting is also presented. As an example, bounding boxes, such as bounding boxes 240 may be overlaid on image 210 to identify the objects that resulted in the counting result 230. Other examples of additional information may include coordinates of the bounding boxes, use of other shapes, extracted sub-images, and/or the like. In some examples, bounding boxes 240 allow the user to interpret and/or verify that counting result 230 is correct for the right reasons.

Figure 3:
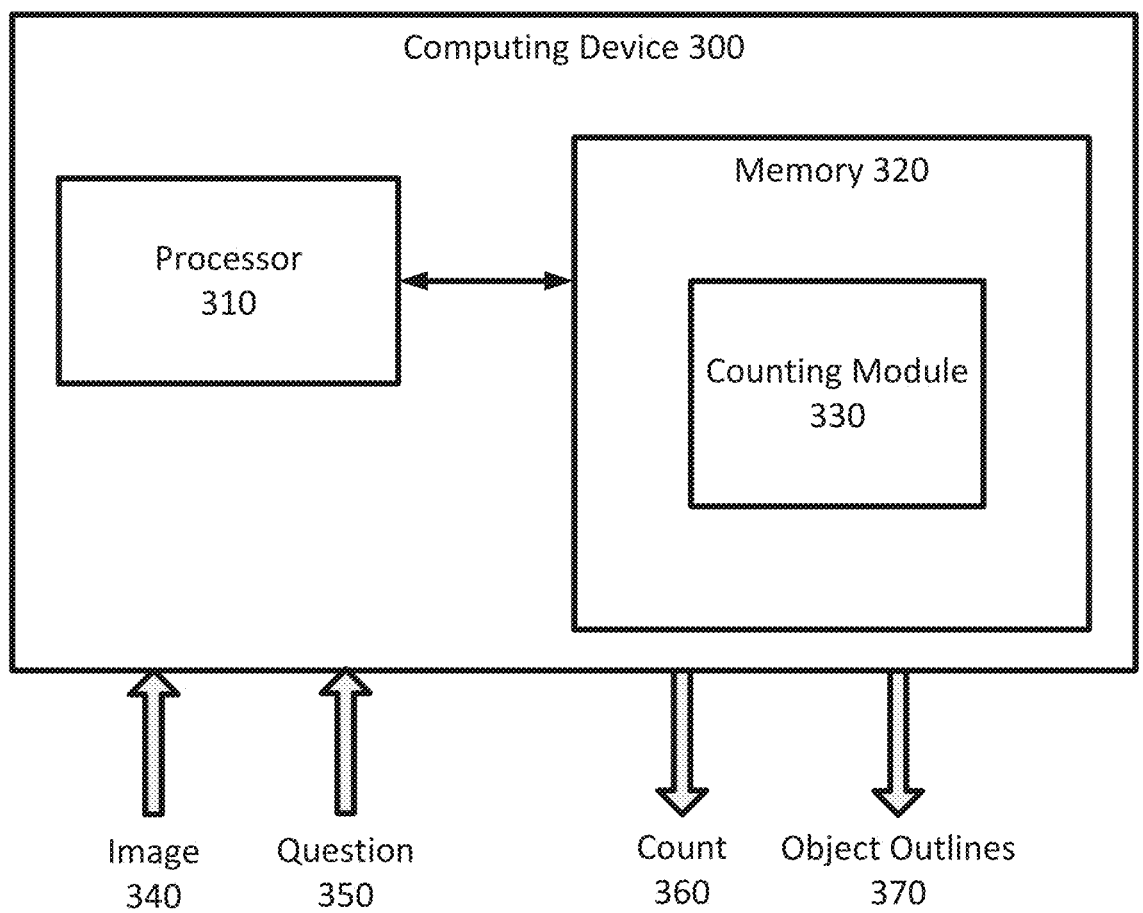
FIG. 3 is a simplified diagram of a computing device according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

As shown, memory 320 includes a counting module 330 that may be used to implement and/or emulate any of the counting systems described further herein and/or to implement any of the methods described further herein. In some examples, counting module 330 may be used to count the objects in an image that match criteria included in a question about the image. In some examples, counting module 330 may also handle the iterative training and/or evaluation of a counting system used to count the objects in an image that match criteria included in a question about the image. In some examples, memory 320 may include non-transitory, tangible, machine readable media that includes executable code that when run by one or more processors (e.g., processor 310) may cause the one or more processors to perform the counting methods described in further detail herein. In some examples, counting module 330 may be implemented using hardware, software, and/or a combination of hardware and software. As shown, computing device 300 receives an image 340 and a counting question 350 about image 340, which are provided to counting module 330, which generates a count 360 of the objects from image 340 matching a criteria from question 350 and a set of object outlines 370 including an outline of each of the counted objects.

Figure 4:
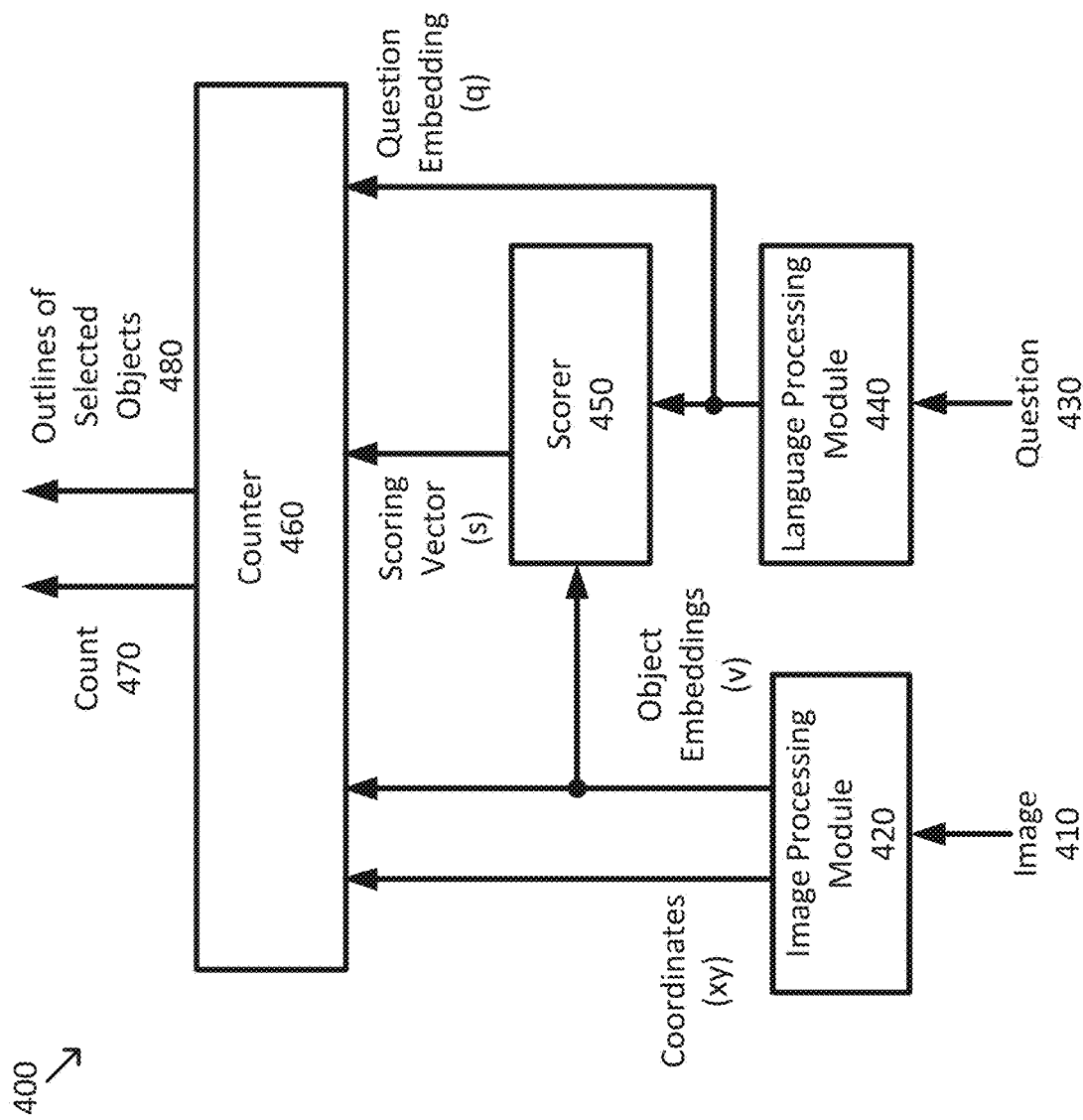
FIG. 4 is a simplified diagram of a system for counting objects in an image according to some embodiments.

FIG. 4 is a simplified diagram of a system 400 for counting objects in an image according to some embodiments. According to some embodiments, system 400 may be capable of performing method 100, may be implemented by counting module 330, and/or emulated by counting module 330. As shown in FIG. 4, system 400 receives an image 410. In some examples, image 410 may be received as a file in an image format, such as GIF, JPEG, bitmap, and/or the like. In some examples, image 410 may be received from an imaging device, such as a camera, a video camera, and/or the like.

Image 410 is provided to an image processing module 420. In some examples, image processing module 420 processes image 410 and generates a set of coordinates xy. Each entry in the coordinates xy identifies a rectangular bounding box (e.g., (x min, y min, x max, y max)$\in \mathbb{R}^4$) identifying a candidate object within image 410. And although coordinates xy includes rectangular bounding boxes it is understood that other bounding shapes (e.g., circles) and/or region identifying approaches are possible. Image processing module 420 further generates object embeddings v that encode characteristics of each of the objects identified by a corresponding rectangular bounding box in coordinates xy into an embedding space. In some examples, image processing module 420 includes a Faster R-CNN that generates coordinates xy and object embeddings v. The Faster R-CNN is described in further detail in Ren, et al., "Faster R-CNN: Towards Real-Time Object Detection with Region Proposal Networks," *Advances in Neural Information Processing Systems* 28, 2015, which is incorporated by reference herein. In some examples, each of the object embeddings maps information from image 410 associated with a corresponding rectangular bounding box into a vector $v_i \in \mathbb{R}^{2048}$. In some examples, the Faster R-CNN is pre-trained as is described in Anderson, et al., "Bottom-Up and Top-Down Attention for Image Captioning and VQA," *Computer Vision and Pattern Recognition Conference*, 2017, which is incorporated by reference herein. In some examples, the number of objects included in coordinates xy and object embeddings v is fixed at and/or limited to 1024.

System 400 further receives a question 430. In some examples, question 430 is a counting question, such as question 220. In some examples, the question may be received as a file in an text-interpretable format, such as text, XML, JSON, a word processing format, and/or the like. In some examples, the question may be typed in by a user, transcribed from an audio sample, and/or the like. In some examples, question 430 may be expressed in natural language (e.g., English) with each word encoded into a vector $x_i \in \mathbb{R}^{300}$. In some examples, the word encodings are the GloVe encodings described in further detail in Pennington, et al., "Global Vectors for Word Representation," *Proceedings of the* 2014 *Conference on Empirical Methods in Natural Language Processing (EMNLP)*, pp. 1532-1543, 2014, which is incorporated by reference herein.

The encoded question $\{x_1, x_2, \ldots, x_m\}$ is provided to a language processing module 440, which generates as output question embedding q that encodes semantic characteristics of question 430. In some examples, language processing module 440 includes a recurrent long-term short-term memory (LSTM) network, which generates question embedding q according to Equation 1. LSTM networks for language processing are described in further detail in Hochreiter, et al. "Long Short-Term Memory," *Journal of Neural Computation,* 9(8), pp. 1735-1780, 1997, which is incorporated by reference herein. In some examples, question embedding q is the same size and in the same embedding space as each of the object embeddings $v_i$ in object embeddings v.

$$h^t = LSTM(x^t, h^{t-1})$$

$$q = h^T \qquad \text{Equation 1}$$

Question embedding q from language processing module 440 and object embeddings v from image processing module 420 are provided to a scorer 450. Scorer 450 generates a scoring vector s, which includes a score $s_i \in \mathbb{R}^n$ for each of the object embedding $v_i$ in object embeddings v. Each score, $s_i$ indicates how well the corresponding object embedding $v_i$ matches question embedding q. In some examples, each score $s_i$ is determined according to Equation 2, where $f^s$ is a layer of gated tan h units (GTUs), which maps a concatenation of question embedding q and object embedding $v_i$ to score $s_i$. GTUs are described in van den Oord, et al. "Conditional Image Generation with PixelCNN Decoders," *Advances in Neural Information Processing Systems* 29, 2016 and the use of GTUs for scoring are described in Anderson, et al., "Bottom-Up and Top-Down Attention for Image Captioning and VQA," *Computer Vision and Pattern Recognition Conference*, 2017, each of which is incorporated by reference herein.

$$s_i = f^s([q, v_i]) \qquad \text{Equation 2}$$

Coordinates xy, object embeddings v, score vector s, and question embedding q are provided to a counter 460. Counter 460 generates a count 470 and a set of outlines 480 of the objects selected for counting. Various embodiments of counter 460 are described in further detail below.

Figure 5:
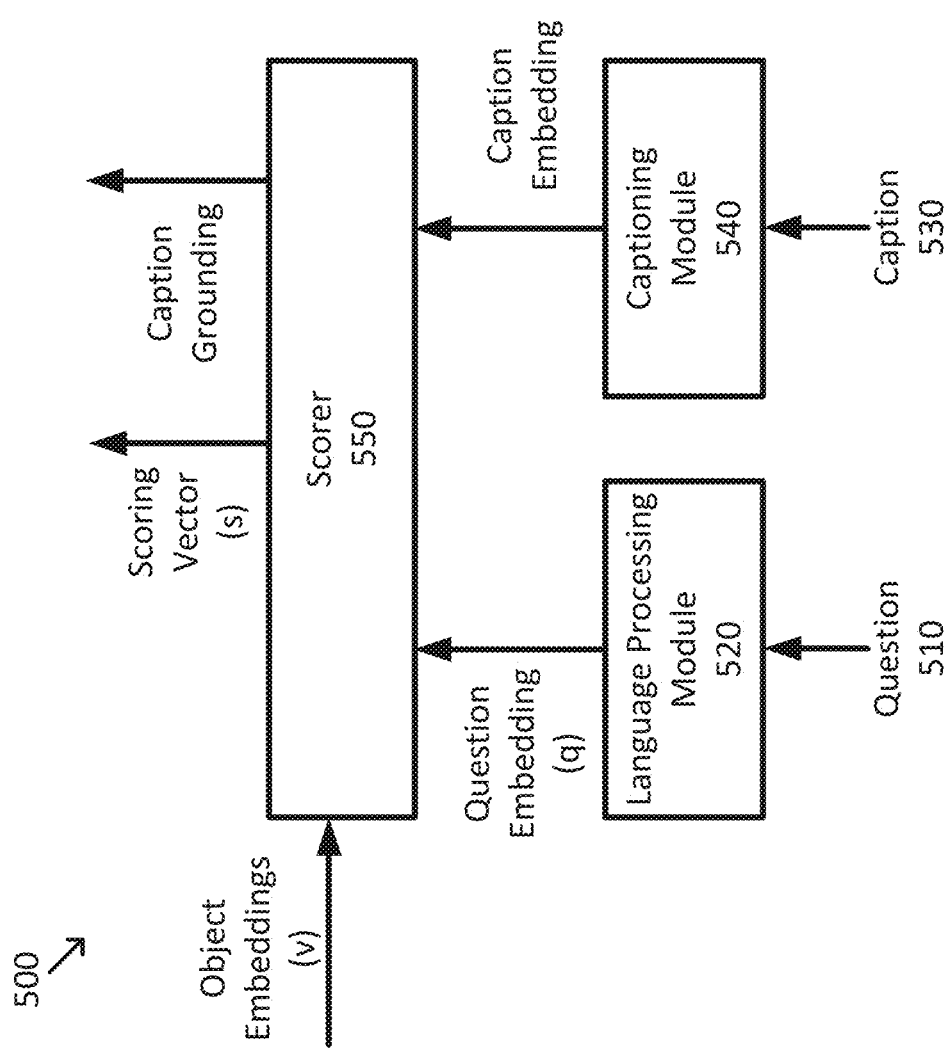
FIG. 5 is a simplified diagram of another embedding and scoring module according to some embodiments.

FIG. 5 is a simplified diagram of another embedding and scoring module 500 according to some embodiments. In some embodiments, embedding and scoring module 500 may be used as an alternative to language processing module 440 and scorer 450 of system 400. As shown in FIG. 5, embedding and scoring module 500 receives a question 510, which is provided to language processing module 520 to generate question embedding q. In some examples, question 510 and language processing module 520 are substantially similar to question 430 and language processing module 440, respectively.

Embedding and scoring module 500 further receives a caption 530, which is provided to a captioning module 540. In some examples, caption 530 corresponds to a textual description of the content of a region within the same image used to generate object embeddings v. In some examples, the same image may correspond to image 410. In some examples, captioning module 540 may include an LSTM-based architecture similar to language processing module 520.

Question embedding q and the caption embedding as well as object embeddings v (e.g., from image processing module 420) are provided to a scorer 550, which generates scoring vector s. In some examples, scorer 550 is similar to scorer 450. In some examples, scorer 550 may also provide caption grounding in addition to scoring vector s. In some examples, caption grounding attempts to match a region of an image to a caption, which is similar to VQA. In some examples, multiple captions 530 are provided and scorer 550 generates a scoring of how well each object in object embeddings v matches each of the embedded captions. In some embodiments, the inclusion of the caption grounding in embedding and scoring module 500 allows for better training of scorer 550 in comparison to scorer 450 without the caption grounding.

Figure 6:
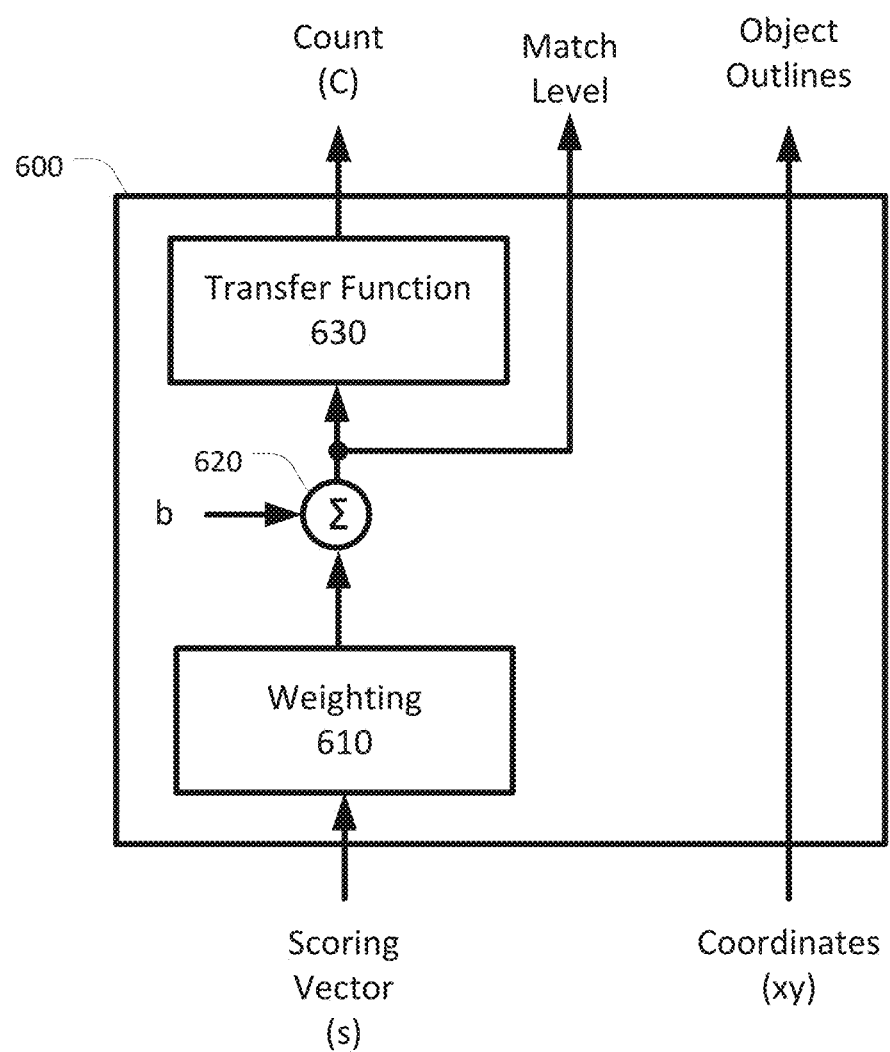
FIGS. 6 and 7 are simplified diagrams of counters according to some embodiments.

FIG. 6 is a simplified diagram of a counter 600 according to some embodiments. In some embodiments, counter 600 may be used as counter 460. In some embodiments, counter 600 may be referred to as a SoftCount counter 600. As shown in FIG. 6, counter 600 receives a scoring vector s, which may be consistent with scoring vector s from FIGS. 4 and 5. Scoring vector s is provided to a weighting module 610 which weights the scores $s_i$ in scoring vector s according to trainable weights W. A trainable bias b is further added to the weighted scores using a summing unit 620. The resulting total is provided to a transfer function 630, which generates a count C. Counter 600 generates count C according to Equation 3, where i indicates each of the candidate objects in object embeddings v, which may correspond to the question. In some examples, σ is a sigmoid transfer function, such as softmax, log-sigmoid, hyperbolic tangent sigmoid, and/or the like. In some examples, counter 600 generates a trainable weighted sum of the scores $s_i$ of each of the objects in the image, and the result is rounded to provide a whole number result.

$$C = \text{round}\left(\sum_i \sigma(W s_i + b)\right) \qquad \text{Equation 3}$$

Counter 600 further outputs the output of summing unit 620 as a match level and passes through coordinates xy as the object outlines as output by counter 600. By passing coordinates xy of each of the detected objects along with the match level, partial interpretability of counter 600 is possible because the match level of each of the objects provides an indication of the relative strength of each of the objects that match the question. In some embodiments, scoring vector s may be substituted for the output of summing unit 620 to provide the match level.

In some examples, counter 600 may be trained via back propagation so as to minimize the Huber loss $L_i$ of the counting results according to Equation 4, where $C^{GT}$ is the ground truth count for the image and question provided for counting.

$$L_i = \begin{cases} 0.5 e^2 & e \leq 1 \\ e - 0.5 & e > 1 \end{cases} \qquad \text{Equation 4}$$

$$e = |C - C^{GT}|$$

Figure 7:
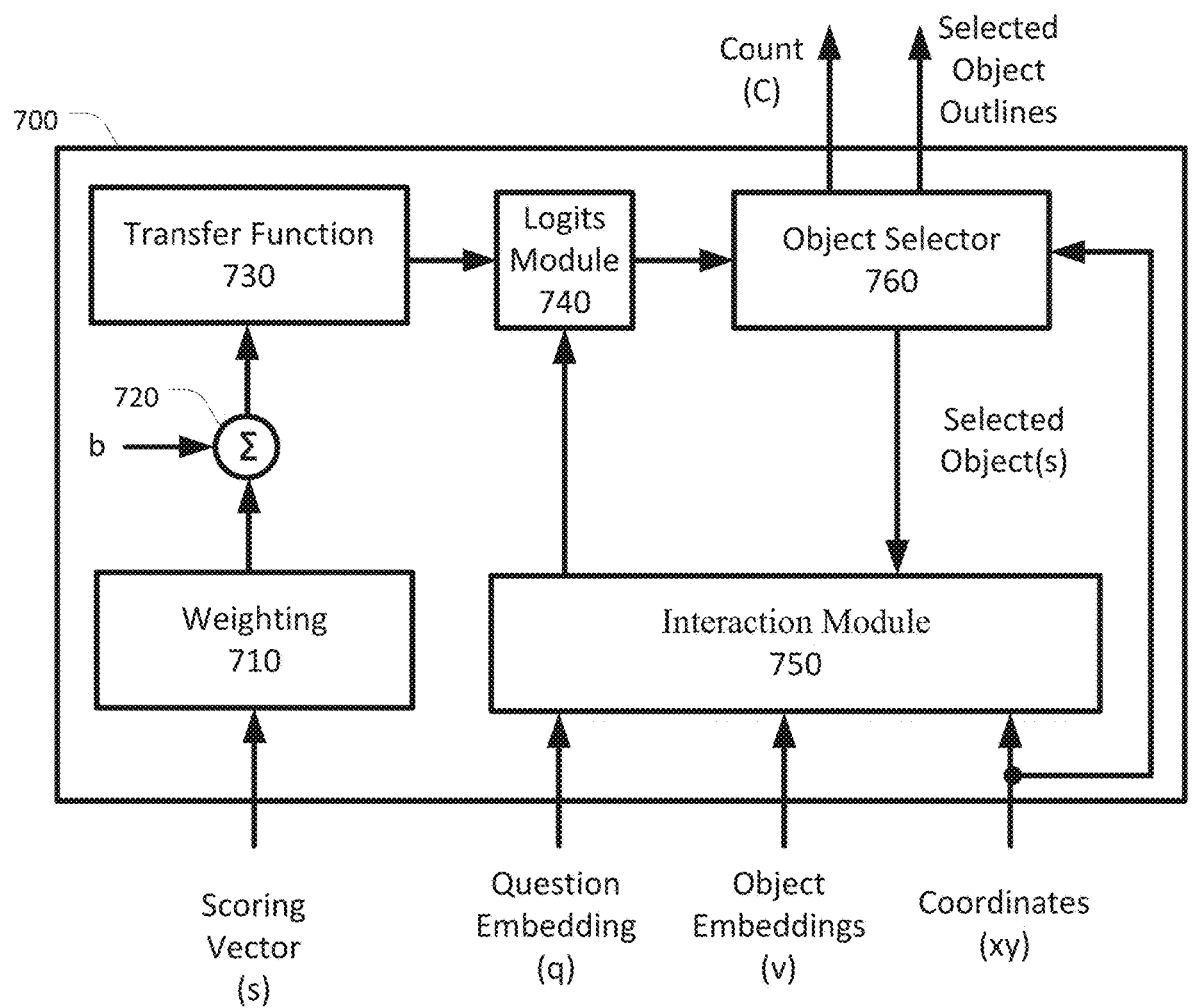

FIG. 7 is a simplified diagram of another counter 700 according to some embodiments. In some embodiments, counter 700 may be used as counter 460. In some embodiments, counter 700 may be referred to as an interpretable reinforcement learning counter (IRLC) 700. As shown in FIG. 7, counter 700 receives a scoring vector s, which may be consistent with scoring vector s from FIGS. 4 and 5. Scoring vector s is provided to a weighting module 710 which weights the scores $s_i$ in scoring vector s according to trainable weights W. A trainable bias b is further added to the weighted scores using a summing unit 720. The resulting total is provided to a transfer function 730. In some examples, weighting module 710, summing unit 720, and transfer function 730 generate an output according to Equation 5. In some examples, f may correspond to the pure linear function, the softmax function, and/or the like. The resulting total is provided to a transfer function 730, whose output is provided to a logits module 740 as an initial set of logit values $k^0$. Each logit value is an indicator of how well the corresponding object is likely to satisfy the counting question being considered by counter 700.

$$k^0 = f(W s + b) \qquad \text{Equation 5}$$

Counter 700 further includes an interaction module 750, which receives coordinates xy and object embeddings v (e.g., from image processing module 420) as well as question embedding q (e.g., from language processing module 440 and/or language processing module 520). Interaction module 750 further receives information on each object previously selected by object selector 760. Interaction module 750 provides updates to the logit values k being maintained by logits module 740 that are caused by the selection of an object to be counted by object selector 760. In some examples, interaction module 750 maintains a matrix of interaction terms $\rho_{ij}$ according to Equation 6, where [,] is vector concatenation, $\hat{v}_i$ is a normalized version of object embedding $v_i$ for object i, $xy_i$ corresponds to the bounding box for object i, $IoU_{ij}$, $O_{ij}$, and $O_{ji}$ are overlap statistics for objects i and j. In some examples, $f^\rho$ corresponds to a trainable two-layer perceptron network using rectified linear unit (ReLU) activation in the hidden layers. In some examples, because interaction module 750 considers similarities between the object embeddings v and overlaps between the rectangular bounding boxes of two objects, interaction module 750 is able to learn not to count an object twice even when scoring vector s includes two potential objects i and j with high scores $s_i$ and $s_j$ and an overlap in area.

$$\rho_{ij} = f^\rho([Wq, \hat{v}_i^T \hat{v}_j, xy_i, xy_j, IoU_{ij}, O_{ij}, O_{ji}]) \quad \text{Equation 6}$$

$$IoU_{ij} = \frac{\text{area}(xy_i \cap xy_j)}{\text{area}(xy_i \cup xy_j)}$$

$$O_{ij} = \frac{\text{area}(xy_i \cap xy_j)}{\text{area}(xy_i)}$$

$$O_{ji} = \frac{\text{area}(xy_i \cap xy_j)}{\text{area}(xy_j)}$$

Object selector 760 receives the logit values k from logits module 740 and determines whether another object is to be counted or that counting of the objects matching the criteria of the question is complete. Object selector 760 operates in an iterative fashion and, with each iteration, object selector 760 either selects the object with the highest logit value or terminates the counting. When object selector 760 selects an object for counting, the selected object is passed to interaction module 750 to determine how selection of that object affects the logit values k of other objects being considered for counting. In some examples, object selector 760 selects an object to count using Equation 7, where $a^t$ corresponds to the t-th object selected for counting and $\zeta$ corresponds to a learnable threshold that indicates that no current logit value is high enough to represent a countable object. With each new question, object selector 760 is initialized so that no objects are selected.

$$a^t = \text{argmax}[k^t, \zeta] \quad \text{Equation 7}$$

Once an object is selected for counting, logits module 740 uses the interaction values from interaction module 750 to update the logit values according to Equation 8, where $\rho(a^t,\bullet)$ corresponds to the row of interaction matrix $\rho$ corresponding to the selected object $a^t$.

$$k^{t+1} = k^t + \rho(a^t,\bullet) \quad \text{Equation 8}$$

In some embodiments, counter 700 may be trained using reinforcement learning. In some examples, the REINFORCE learning rule is used. The REINFORCE learning rule is described in Williams, "Simple Statistical Gradient-following Methods for Connectionist Reinforcement Learning," *Machine Learning*, 8:229-256, 1992, which is incorporated by reference herein. In some examples, the reward R is determined according to a variation of policy gradient called self-critical sequence training. Self-critical sequence training is described in Rennie, et al., "Self-critical Sequence Training for Image Captioning," *Computer Vision and Pattern Recognition Conference*, 2017, Anderson, et al., "Bottom-Up and Top-Down Attention for Image Captioning and VQA," *Computer Vision and Pattern Recognition Conference*, 2017, and Paulus, et al, "A Deep Reinforced Model for Abstractive Summarization," arXiv, 2017, each of which is incorporated by reference herein. In some examples, the counting loss $L_C$ may be determined according to Equation 9, where $p^t$ is approximately equal to $a^t$, $E^{greedy}$ is the baseline count error obtained by greedy object selection (e.g., selecting the object with the highest logit $k^t$ using Equation 7) and E is the baseline count error obtained by selecting the object randomly (e.g., sampling) based on the probability values $p^t$, with training being performed to reinforce the selection of the randomly selected objects.

$$L_C = -R \sum_t \log(p^t) a^t \quad \text{Equation 9}$$

$$R = E^{greedy} - E$$

$$E = |C - C^{GT}|$$

$$p^t = \text{softmax}([k^t, \zeta])$$

In some examples, additional errors are included in the loss function as shown in Equation 10, where H is the policy entropy function and $L_1$ is the Huber loss from Equation 4. In some examples, $\lambda_2 = \lambda_3 = 0.005\lambda_1$.

$$L_{total} = \lambda_1 L_C + \lambda_2 P_H + \lambda_3 P_I \quad \text{Equation 10}$$

$$P_H = -\sum_t H(p^t)$$

$$P_I = \sum_{i \in \{a^1,...,a^t\}} \frac{1}{N} \sum_j L_1$$

Figure 8:
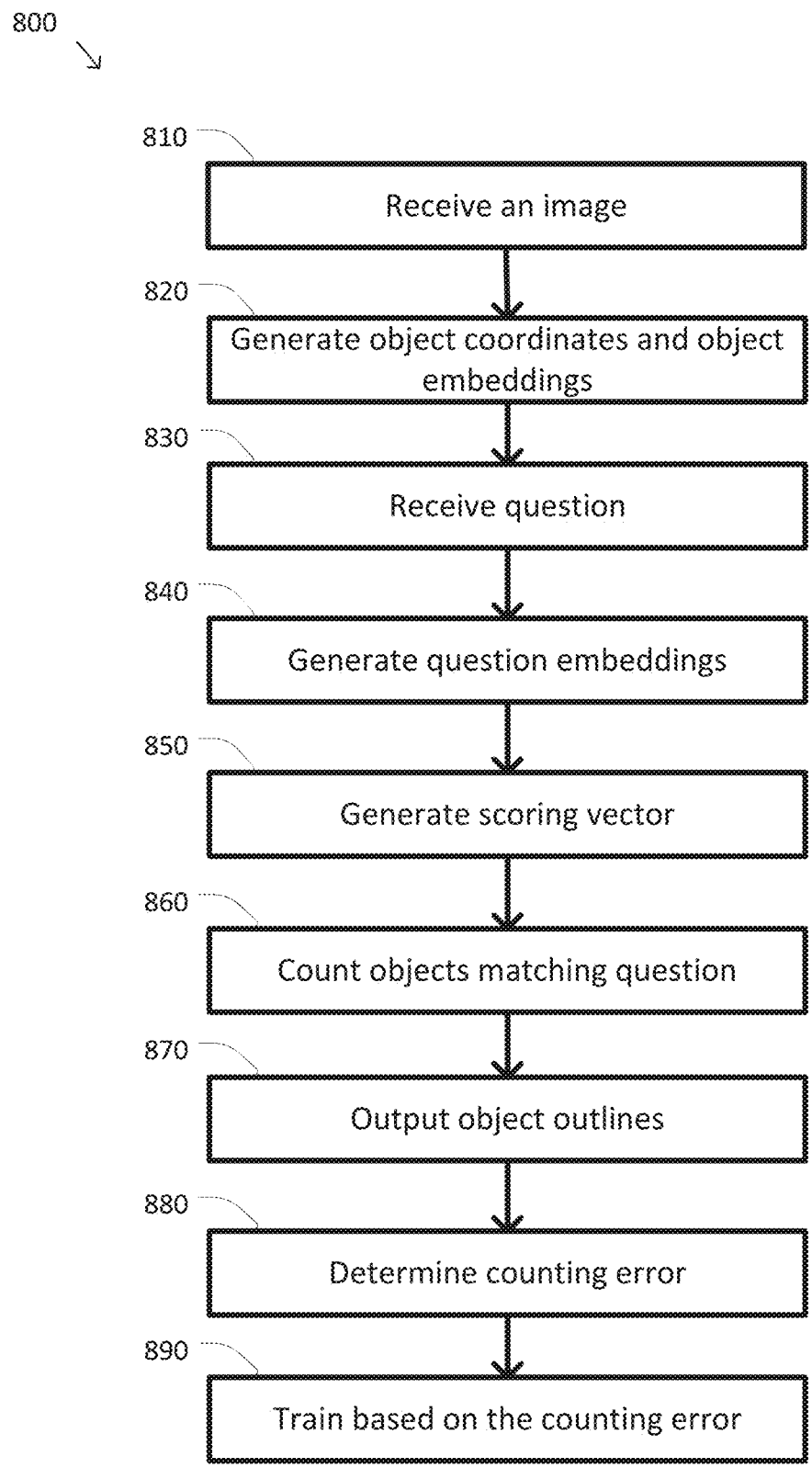
FIG. 8 is a simplified diagram of a method for counting objects in an image according to some embodiments.

FIG. 8 is a simplified diagram of a method 800 of training a counting system according to some embodiments. One or more of the processes 810-890 of method 800 may be implemented, at least in part, in the form of executable code stored on non-transitory, tangible, machine-readable media that when run by one or more processors (e.g., processor 310) may cause the one or more processors to perform one or more of the processes 810-890. According to some embodiments, method 800 may be used to train system 400, counter 600, and/or counter 700. According to some embodiments, method 800 may be performed in different ways than implied by the ordering of FIG. 800. In some examples, processes 810 and 820 may be performed and/or concurrently with processes 830 and 840. In some embodiments, process 870 is optional and may be omitted.

At a process 810, an image is received. In some examples, the image may correspond to image 410. In some examples, the image may be received as a file in an image format, such as GIF, JPEG, bitmap, and/or the like. In some examples, the image may be received from an imaging device, such as a camera, a video camera, and/or the like.

At a process 820, object coordinates and object embeddings are generated. The object coordinates correspond to the border or each candidate object identified in the image received during process 810. The object embeddings include an encoding representing the content of the image from a sub-region identified by a corresponding border in the generated object coordinates. In some examples, the object coordinates describe a rectangular bounding box. In some examples, the object coordinates and object embeddings may be generated using image processing module 420. In some examples, the generated object coordinates may correspond to object coordinates xy and the generated object embeddings may correspond to object embeddings v.

At a process 830, a question is received. In some examples, the question is consistent with question 430 and/or question 510. In some examples, the question may be a counting question, such as "how many animals are there?", "how many trees are there?", and/or the like. In some examples, the question may be received as a file in a text-interpretable format, such as text, XML, JSON, a word processing format, and/or the like. In some examples, the question may be typed in by a user, transcribed from an audio sample, and/or the like. In some examples, a ground truth count associated with the question may also be received.

At a process 840, question embeddings are generated. The question embeddings include an encoding of the question received during process 830. In some examples, the question embeddings may be generated using language processing module 440 and/or language processing module 520. In some examples, the generated question embeddings may correspond to question embeddings q.

At a process 850, a scoring vector is generated. The scoring vector is generated based on the object embedding generated during process 820 and the question embeddings generated during process 840. The scoring vector includes a score indicating how well each of the objects in the generated object embeddings generated during process 820 matches the criteria encoded in the question embeddings generated during process 840. In some examples, the scoring vector may be generated by scorer 450 and/or scorer 550. In some examples, the generated scoring vector may correspond to scoring vector s.

At a process 860, objects matching the question are counted. The resulting count corresponds to the number of objects in the image received during process 810 that appear to match the criteria from the question received during process 830. In some embodiments, the count may be generated by weighting module 610, summing unit 620, and transfer function 630 of SoftCount counter 600 according to Equation 3. In some embodiments, the count may be generated according to IRLC 700.

Figure 9:
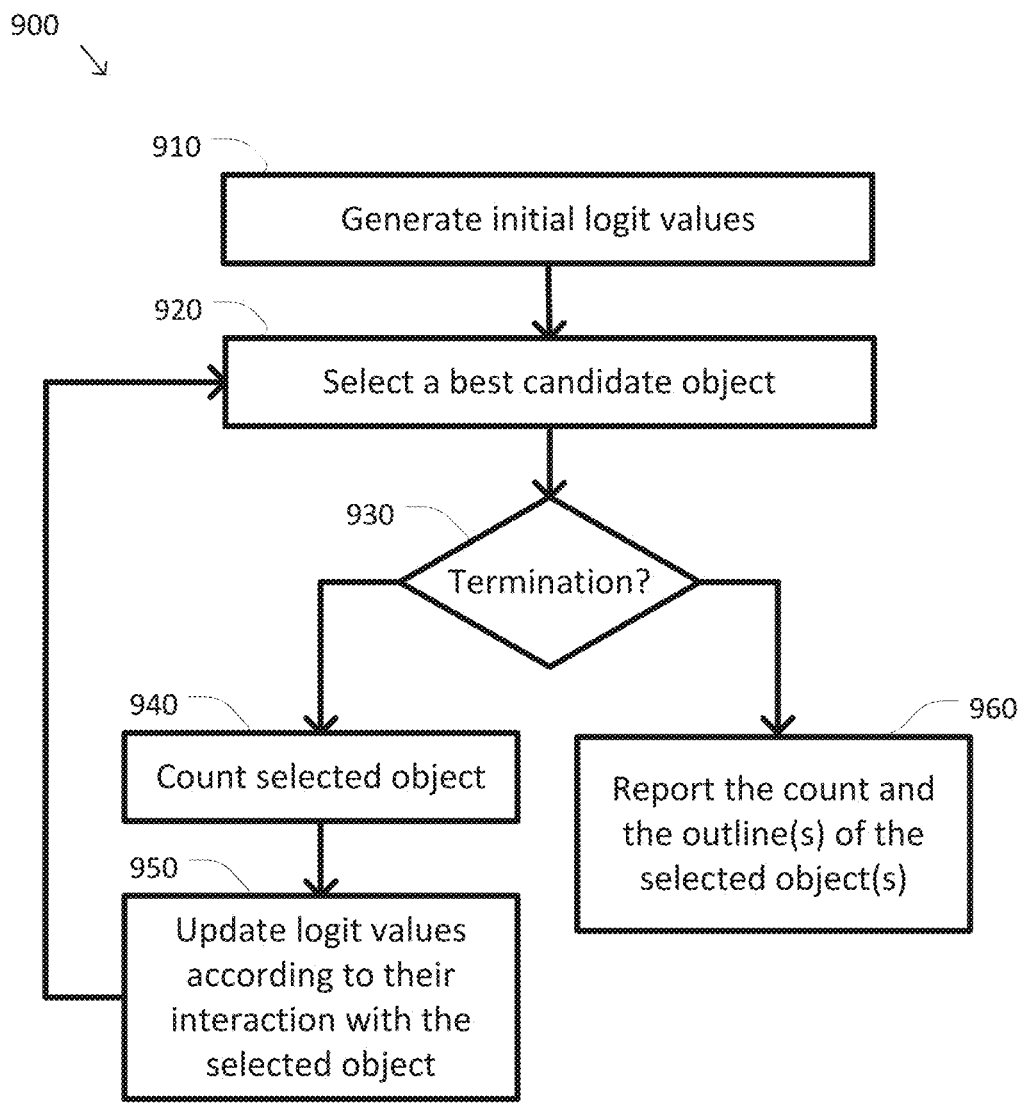
FIG. 9 is a simplified diagram of a method for counting objects matching a question according to some embodiments.

FIG. 9 is a simplified diagram of a method 800 for counting objects matching a question according to some embodiments. One or more of the processes 910-960 of method 900 may be implemented, at least in part, in the form of executable code stored on non-transitory, tangible, machine-readable media that when run by one or more processors (e.g., processor 310) may cause the one or more processors to perform one or more of the processes 910-960. According to some embodiments, method 900 is consistent with the method used by IRLC 700 to count objects matching the criteria in a question.

At a process 910, initial logit values are generated. Each of the initial logit values corresponds to how well a corresponding object matches the criteria in the question. The initial logit values are generated based on a scoring vector, such as the scoring vector generated during process 850. In some examples, the initial logit values are generated by weighting module 710, summing unit 720, and transfer function 730 according to Equation 5.

At a process 920, a best candidate object is selected from those objects not yet selected and counted by method 900. The best candidate object corresponds to the not yet selected object having the highest logit value. In some examples, the highest logit value may be determined according to Equation 7. In some examples, during training, two candidate objects are selected based on Equation 7 and randomly based on the $p^t$ probabilities of Equation 9 with both selected objects being used for separate counting results in parallel. In some examples, process 920 may further record which object is selected, such as by storing an index value of the selected object. In some examples, process 920 is performed by object selector 760.

At a process 930, it is determined whether the object counting is to be terminated. In some examples, object counting is terminated when none of the remaining unselected objects has a corresponding logit value that is greater than a termination value, such as termination value $\zeta$. In some examples, process 920 may select termination value $\zeta$ instead of the logit value of an unselected object according to Equation 7. In some examples, process 930 is performed by object selector 760. When an object is selected during process 920 instead of the termination value, the object is counted and the logit values are updated beginning with a process 940. When no unselected objects have a corresponding logit value greater than the termination value and the termination value is selected during process 920, the results of the counting are reported using a process 960.

At process 940, the selected object is counted. In some examples, the object selected during process 920 may be counted by incrementing a counter that was initialized to zero before method 900 began. In some examples, process 940 is performed by object selector 760.

At a process 950, the logit values are updated according to their interaction with the object selected during process 920. The logit value for each of the unselected objects is updated based on an interaction between each of the unselected objects and the object selected during process 920. In some examples, the logit value of a first object from the unselected objects may be updated based on the question embeddings (e.g., the question embeddings generated during process 840), similarities between the object embeddings (e.g., the object embeddings generated during process 820) of the first object and the object selected during process 920, the coordinates (e.g., the coordinates xy generated during process 820) of the first object and the object selected during process 920, and overlap statistics between the coordinates of the first object and the object selected during process 920. In some examples, the logit values may be updated using logits module 740 and interaction module 750 according to Equations 7 and 8. Once the logit values are updated by process 950, method 900 returns to process 920 to determine whether another object is selected and counted or the termination value is selected.

At process 960, the count and the outline(s) of the selected object(s) are reported. In some examples, the count is the value of the counter incremented during process 940. In some examples, when no objects are counted (e.g., the counter is zero), a count of zero is reported and no outlines are reported. In some examples, when the count is one or higher, the one or more outlines correspond to the coordinates (e.g., the coordinates xy generated during process 820) of each of the objects selected by the counting iterations of process 920. In some examples, each of the one or more outlines may correspond to a bounding rectangle for a sub-portion of the image that contains the corresponding object. In some examples, process 960 may determine which of the coordinates to report based on the object indices stored during process 920. In some examples, process 960 is performed by object selector 760.

Figure 10:
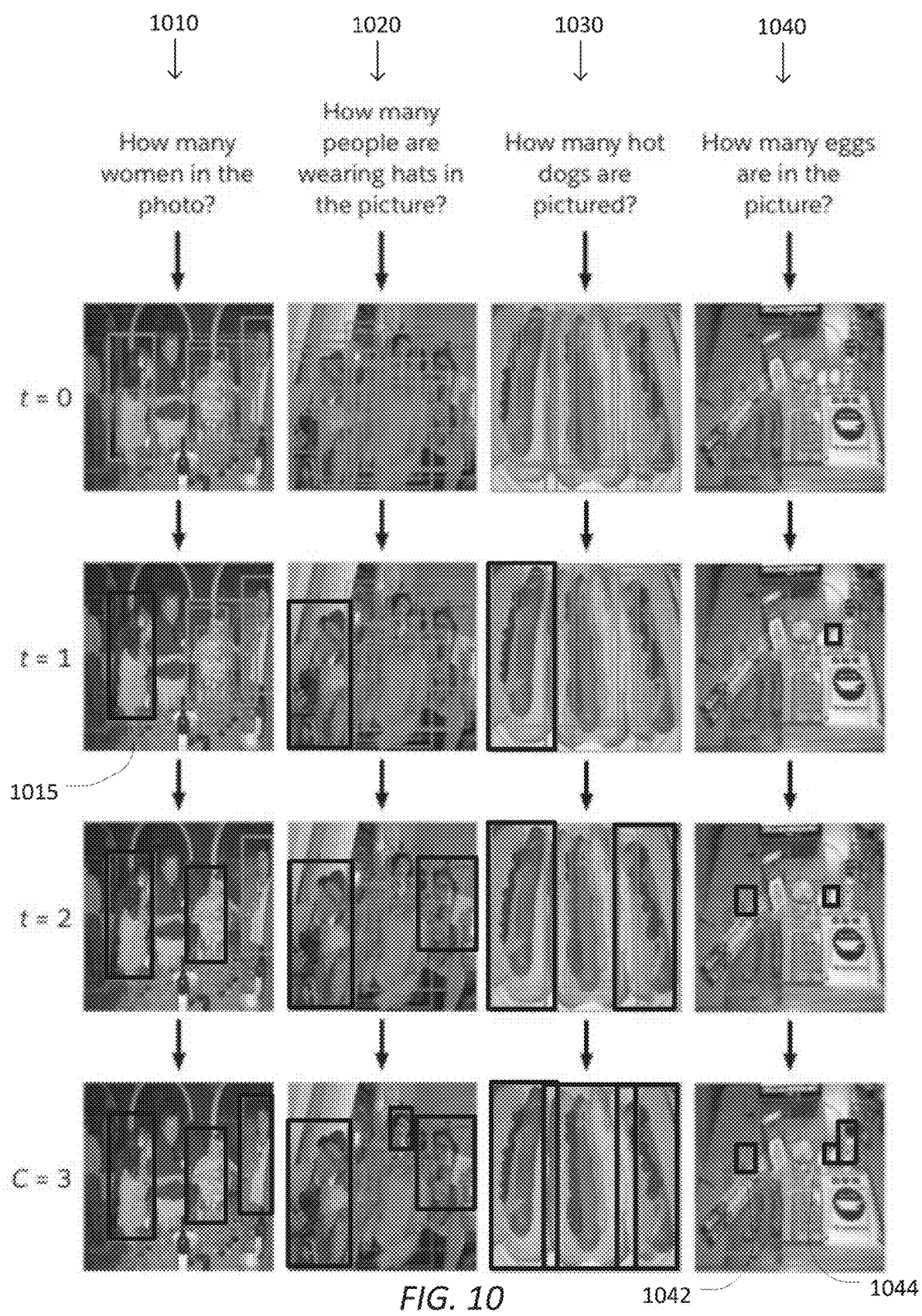
FIG. 10 is a simplified diagram of images and counting questions according to some embodiments.

The operation of method 900 is demonstrated in FIG. 10, which is a simplified diagram of images and counting questions according to some embodiments. More specifically, FIG. 10 shows the counting results, for four image and question pairs 1010, 1020, 1030, and 1040, through each iteration of IRLC 700 and method 900, where method 900 performs a variation of process 960 along with each performance of processes 940 and 950. At t=0, the image is shown with the outlines of each of the candidate objects identified by, for example, process 820. Each of the coordinates is shown as the outline of a bounding rectangle around the corresponding candidate object. In some examples, the opacity and/or intensity of the rectangle is rendered to indicate the strength of the corresponding logit value generated during process 910. At t=1, a first object has been selected by process 920 and its corresponding bounding rectangle is rendered in a different color to indicate a selected and counted object. An example of the bounding rectangle for a selected and counted object is shown as a rectangle 1015 for image and question pair 1010. With the selection of the first object at t=1, the logit values are updated by process 950 and reflected by the changes in opacity and/or intensity of the bounding rectangles of the remaining candidate objects. At t=2, a second object is selected and counted, the bounding rectangle of the second object is updated as well the logit values based on the selection of the second object. For example, the t=2 image with bounding rectangle overlays for image and question pair 1010 shows that the logit values of most of the unselected objects have been significantly reduced. At C=3, a third object is selected and counted, the bounding rectangle of the third object is updated as well the logit values based on the selection of the third object. As none of the remaining unselected objects have a logit value greater than the termination value, method 900 concludes with a count value of 3 and the outlines (e.g., the bounding rectangles) of the counted objects is reported. Image and question pair 1040 indicates the further value of making the counting results interpretable by reporting the coordinates of the selected and counted objects. Even though method 900 obtained the correct count of 3 for image and question pair 1040, the reported coordinates indicate that the wrong three objects were counted as object 1042 is not an egg and object 1044 is an egg that was not counted. Thus, the interpretability provided by reporting the outlines of the counting objects provides the additional ability to differentiate between counting results for the correct reasons and counting results that are correct, but for the wrong reasons.

Referring back to FIG. 8, at an optional process 870, object outlines are output. In some embodiments, when process 860 used SoftCount counter 600, the object outlines may correspond to each of the objects in the object coordinates determined during process 820. In some examples, each of the outlines may also be associated with a corresponding metric indicating how well the corresponding object matched the criteria of the question received during process 830. In some examples, the metric indicating how well the corresponding object matched the criteria may be based on the corresponding score value generated during process 850 and/or the corresponding value generated by function a of Equation 3. In some embodiments, when process 860 used IRLC 700 and/or method 900, the object outlines may correspond to each of the objects selected by object selector 760 and/or process 920. In some examples, the object outlines may be output by overlaying the object outlines on the image received during process 810, for example such as is shown by bounding boxes 240 in FIG. 2. In some examples, when process 860 used SoftCount counter 600, each of the object outlines may be drawn with an opacity and/or intensity based on the corresponding metric indicating how well the corresponding object matched the criteria of the question received during process 830. In some examples, the opacity and/or intensity may be set according to the amount the corresponding object contributed to the count in Equation 3. In some examples, the object outlines are useable to interpret and/or validate the count determined during process 860.

At a process 880, counting error is determined. The counting error indicates how well the count determined during process 860 matches a ground truth count for the image. In some embodiments, when process 860 uses SoftCount counter 600, the counting error may be determined according to Equation 4. In some embodiments, when process 860 uses IRLC 700 and/or method 900, the counting error may be determined according to Equation 9 and/or Equation 10 using both counting results based on the different candidate objects selected during process 920.

At a process 890, the counting is trained based on the counting error determined during process 890. In some examples, the counting error may be back propagated to adjust the various weights, biases, and/or the like in counter 460, counter 600, and/or counter 700. In some embodiments, the counter error may be further back propagated to imaging processing module 420, language processing module 440, and/or language processing module 520 to provide end-to-end training of the counting system.

According to some embodiments, method 800 may be repeatedly used as part of a larger training process where a large number of training images and counting questions are each presented in turn to the counting system with training for each pair of image and counting question occurring according to method 800. In some examples, each of the images and counting questions may be presented multiple times during the training with each presentation of the set of images and counting question pairs corresponding to a training epoch. In some examples, the training may occur according to the adaptive moment estimation (ADAM) algorithm. The ADAM algorithm is described in Kingma, et al., "A Method for Stochastic Optimization," *3rd International Conference for Learning Representations,* 2015, which is incorporated by reference herein. In some examples, when the ADAM algorithm is used to train SoftCount counter 600, the learning rate is set to $3 \times 10^{-4}$ and decayed by 0.8 with each epoch after the training accuracy plateaus. In some examples, when the ADAM algorithm is used to train IRLC 700, the learning rate is set to $5 \times 10^{-4}$ and is decayed by 0.99999 with each epoch.

According to some embodiments, method 800 may be modified to generate interpretable counts for images using, for example, system 400. In some examples, an image and question, including an image and question without a ground truth count, may be processed according to processes 810-870 to generate a count and image outlines corresponding to the number of objects in the image that match the criteria of the question.

According to some embodiments, method 800 may be further adapted to perform caption grounding. In some examples, a caption (e.g., caption 530) may be received using a process similar to process 830. In some examples, a caption embedding may be generated by a captioning module (e.g., captioning module 540) using a process similar to process 840. In some examples, a scorer (e.g., scorer 550) may be used to determine which how well the caption corresponds to each of the objects determined during process 820.

Figure 11:
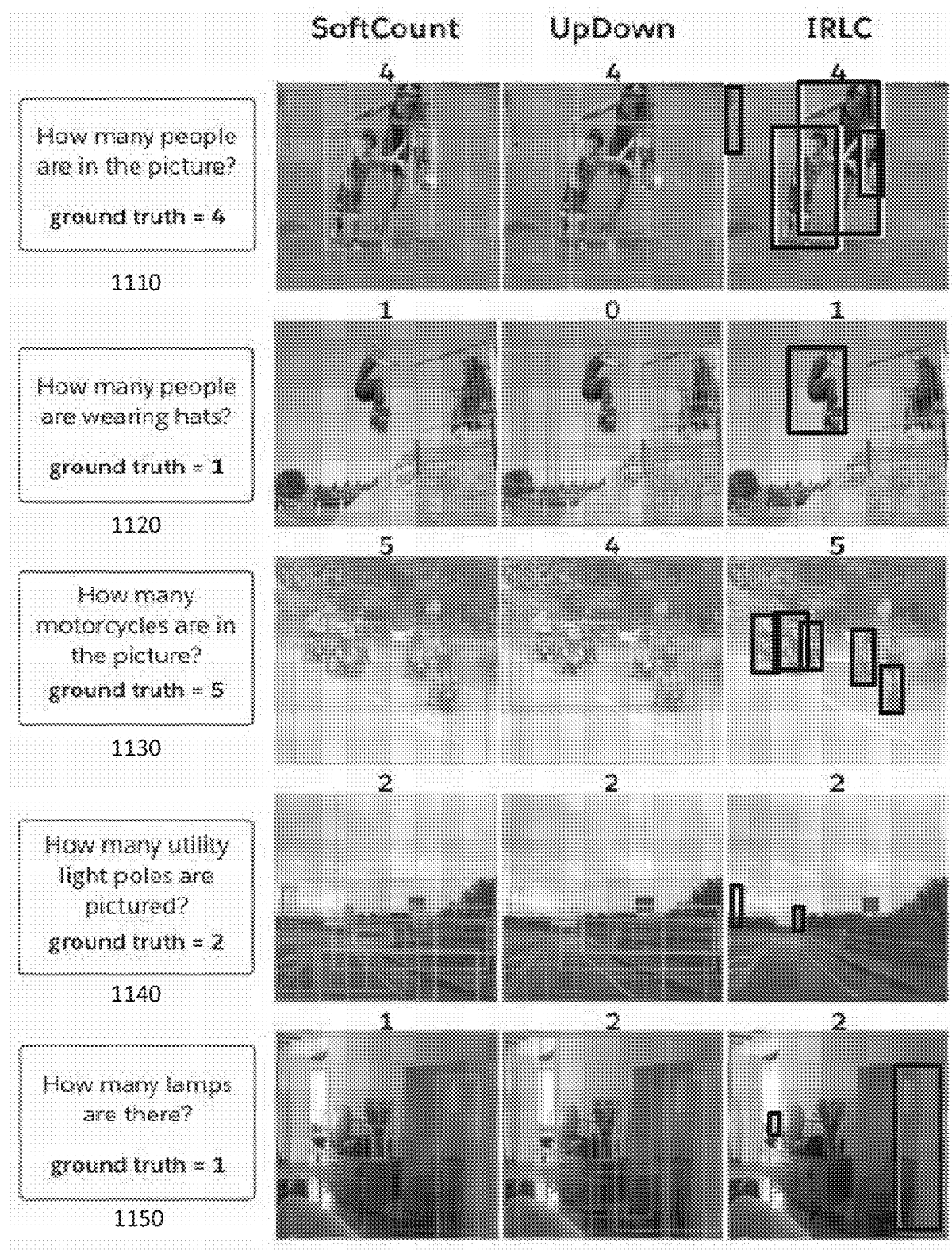
FIG. 11 is a simplified diagram of counting results according to some embodiments.

FIG. 11 is a simplified diagram of counting results according to some embodiments. More specifically, FIG. 11 shows the counting results, for five image and question pairs 1110-1150 along with their ground truth values and the results of three different counters (the SoftCount counter 600, an UpDown counter, and IRLC 700). The UpDown counter is an attention-based counter used as a baseline to comparatively assess the capabilities of SoftCount counter 600 and IRLC 700. The UpDown counter is described in Anderson, et al., "Bottom-Up and Top-Down Attention for Image Captioning and VQA," *Computer Vision and Pattern Recognition Conference*, 2017, which is incorporated by reference herein. Each of the results for SoftCount counter 600 is shown with its count value above the image and the opacity of the various outlines corresponds to the amount the corresponding object contributed to the count in Equation 3, where the contribution varies between (0=transparent) and (1=opaque). Each of the results for the UpDown counter is shown with its count value above the image and the opacity of the various outlines corresponds to the attention focus generated by the UpDown counter. Each of the results for IRLC 700 is shown with its count value above the image and the outlines indicate the counted objects.

According to some embodiments, the counting results of individual image and question pairs, such as those in FIG. 11, provide an indication of the capabilities of each of the SoftCount counter 600, the UpDown counter, and IRLC 700. However, other metrics provide additional insight.

According to some embodiments, one evaluation metric is counting accuracy. In some examples, count accuracy is derived from the counts provided by a panel of 10 human reviewers when presented with each image and question pair. In some examples, a counting answer is considered correct if at least three of the human viewers provided that count with the accuracy of each possible counting answer being determined according to Equation 11. In some examples, the accuracy results may be averaged for multiple panels of reviewers generated by considering each of the possible combinations of human reviewers.

$$\text{Accuracy}(a) = \min\left[\frac{\text{\# humans that answered } a}{3}, 1\right] \quad \text{Equation 11}$$

In some examples, the accuracy value provided by Equation 11 may be used to assess the accuracy of the counting values reported by SoftCount counter 600, the UpDown counter, and IRLC 700 with the accuracy results averaged across each image and question pair evaluated by each respective counter.

According to some embodiments, another evaluation metric is root mean square error (RMSE) determined across each image and question pair evaluated by each respective counter. In some examples, RMSE provides a better indication of overall counting ability as it also accounts for how close an incorrect count is to the ground truth count. In some examples, RMSE is determined according to Equation 12, where N is the number of image and question pairs evaluated by each respective counter and a lower RMSE is desired.

$$RMSE = \sqrt{\frac{1}{N}\sum_i (C_i^{GT} - C_i)^2} \quad \text{Equation 12}$$

According to some embodiments, another evaluation metric is grounding quality. The grounding quality metric captures how relevant each of the objects counted by a counter are to the criteria included in the question. The grounding quality metric is derived from the object categories assigned to various objects in each image in the COCO dataset. Each of the categories x is assigned a GloVe embedding Glove $(x) \in \mathbb{R}^{300}$. In some examples, each object in a test set may be analyzed by first assigning one of the COCO categories or background to each of the candidate objects used for counting (e.g., each of the objects in object embeddings v) by identifying the object in the COCO dataset with the largest intersection over union (IoU) overlap (see Equation 6) with a candidate object. And, if the IoU is greater than 0.5, the candidate object is assigned to the COCO category of the object in the COCO dataset, otherwise the candidate object is assigned as background. The COCO category assigned to each object i from image m is denoted $k_i^m$. Each COCO category present in image m is then converted to a question (e.g., the category "car" is converted to "how many cars are there?"). The image is then examined using a counter, such as SoftCount counter 600 and/or IRLC 700 and a count for the image m and category/question q is determined according to Equation 13, where $w_i^{(m,q)}$ is the count value given by the counter to candidate object i in image m and $N^m$ is the number of candidate objects in image m.

$$C^{(m,q)} = \sum_i^{N^m} w_i^{(m,q)} \quad \text{Equation 13}$$

A weighted sum is then generated that accounts for the semantic similarity between the category of the question q and the category of the candidate object according to Equation 14, where semantic similarity is determined based on the dot product between the GloVe embeddings of the category assigned to the candidate object $k_i^m$ and the category of the question q. When the candidate object $k_i^m$ is assigned to the background, its embedding is a vector of zeros.

$$s^{(m,q)} = \sum_i^{N^m} w_i^{(m,q)} (GloVe(k_i^m)^T GloVe(q)) \quad \text{Equation 14}$$

An aggregate caption grounding metric is then determined for each COCO category across each of the images by accumulating the weighted sums of Equation 14 from individual images and normalizing across the total count according to Equation 13 from each of the images as shown in Equation 15.

$$s^{(q)} = \frac{\sum_m s^{(m,q)}}{\sum_m C^{(m,q)}}$$ Equation 15

Figures 12, 13:
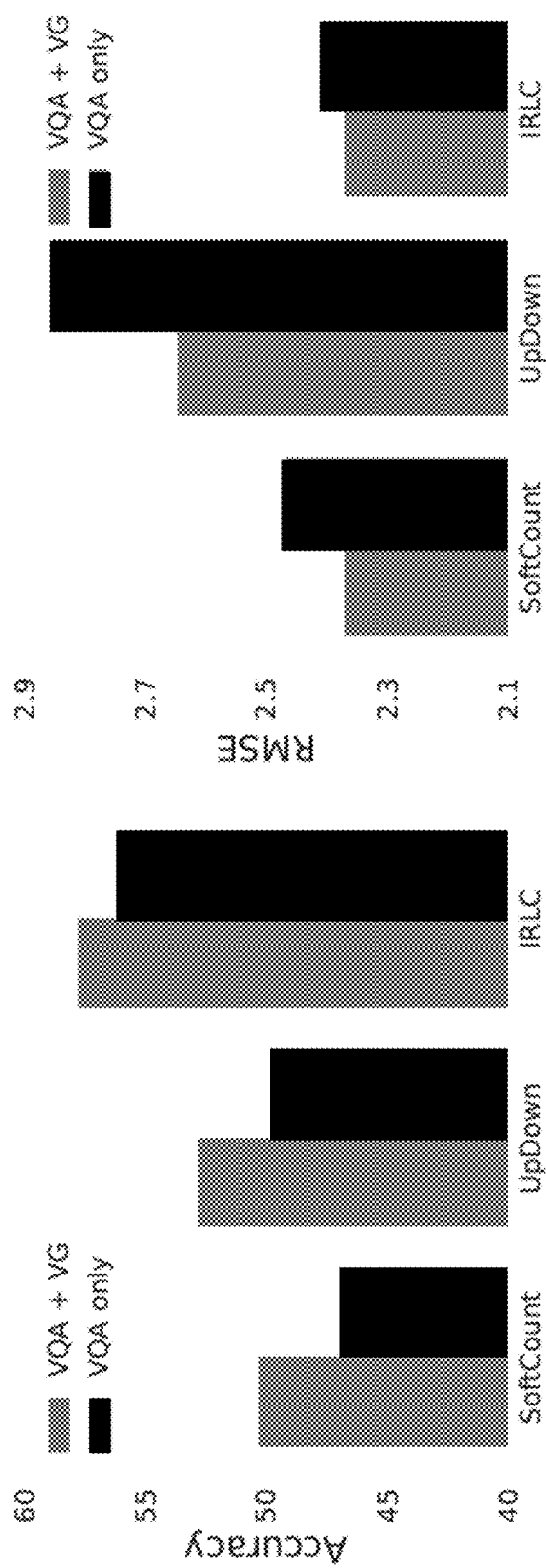
FIGS. 12 and 13 are simplified diagrams of performance results for counting objects in images according to some embodiments.

FIGS. 12 and 13 are simplified diagrams of performance results for counting objects in images according to some embodiments. FIG. 12 shows the accuracy and RMSE of a Guess1 counter, a LSTM counter, SoftCount counter 600, the UpDown counter, and IRLC 700 for image and question pairs from the HowMany-QA test set. The Guess1 counter always guesses that the count is 1 (the most common count in the HowMany-QA test set) and the LSTM counter predicts the count based on a linear projection of the question embeddings (e.g., question embedding q). Results are additionally shown for SoftCount counter 600, the UpDown counter, and IRLC 700 when the counter includes the benefit of the caption grounding training from FIG. 5 (value not in parentheses) in comparison to the counter without benefit of the caption grounding training from FIG. 5 (value in parentheses). As shown in FIG. 12, IRLC 700 demonstrates both the best accuracy and RMSE when caption ground is both included and omitted. And although SoftCount counter 600 demonstrates a lower accuracy than the UpDown counter and IRLC 700 (e.g., it is wrong more often) the RMSE of SoftCount counter 600 is as good as IRLC 700 indicating that SoftCount counter 600 does not tend to be too wrong when it is incorrect.

FIG. 13 shows the differences in accuracy and RMSE for SoftCount counter 600, the UpDown counter, and IRLC 700 when each of these counters is trained using different datasets. As shown, each counter is trained using the VQA HowMany-QA dataset alone (VQA only) and with both the VQA HowMany-QA dataset and the Visual Genome QA dataset. As expected, each of the counters shows an improvement in both accuracy and RMSE with more training. However, IRLC 700 demonstrates both the best accuracy and RMSE of each of the three counters and additionally shows the least fall-off in both accuracy and RMSE when trained without the additional knowledge provided by the Visual Genome QA dataset. SoftCount counter 600 again demonstrate a poorer accuracy, but a better RMSE than the UpDown counter.

Figures 14A, 14B:
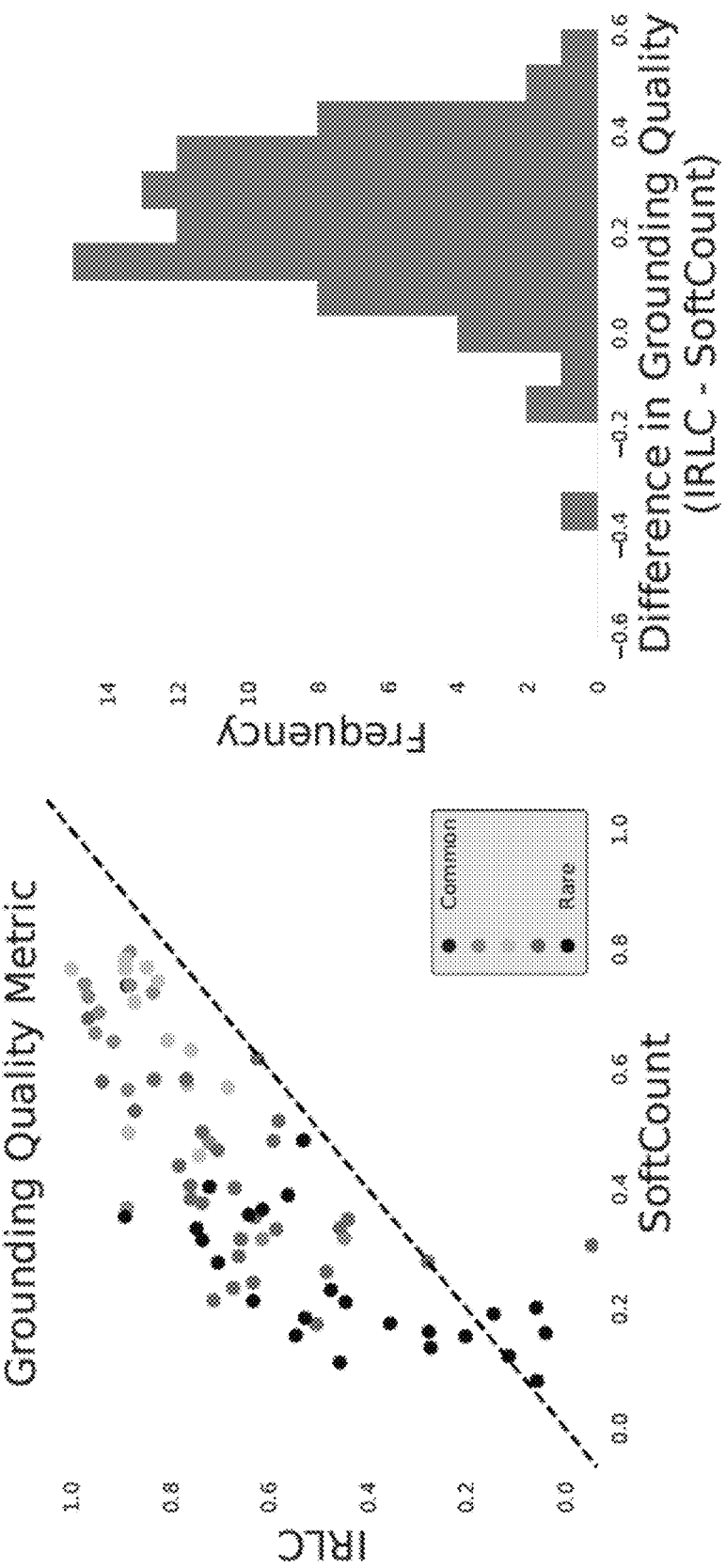
FIGS. 14A and 14B are simplified diagrams of counting grounding quality according to some embodiments.

FIGS. 14A and 14B are simplified diagrams of counting grounding quality according to some embodiments. FIGS. 14A and 14B show the grounding quality of both SoftCount counter 600 and IRLC 700 for each of the COCO categories. As is shown, IRLC 700 generally demonstrates a higher grounding quality metric than SoftCount counter 600 over most categories.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the breadth and scope of the present application should not be limited by any of the embodiments described herein, but should be defined only in accordance with the following and later-submitted claims and their equivalents.

What is claimed is:

1. A system for counting objects in a digital image, the system comprising:
    a digital image processor that identifies objects in an image, maps the identified objects into an embedding space, generates bounding boxes for each of the identified objects, and outputs the embedded objects paired with their bounding boxes;
    a language processor that embeds a question into the embedding space;
    a scorer that determines scores for the identified objects, each respective score determines how well a corresponding one of the identified objects is responsive to the question;
    a counter that determines a count of the objects in the digital image that are responsive to the question based on the scores; and
    the system outputs the count and a corresponding bounding box for each object included in the count.

2. The system of claim 1, wherein the counter:
    determines whether to add a first identified object to the count;
    iteratively applies an interaction filter to remaining identified objects to determine an uncounted object that is most likely responsive to the question based on each previously counted object;
    with each iteration, determines whether to add said uncounted object to the count; and
    determines when to terminate processing objects in the image.

3. The system of claim 2, wherein the counter determines the first identified object to count by identifying which of the identified objects has a highest measure of match to the embedding of the question.

4. The system of claim 3, wherein to determine when to terminate processing objects in the image, the counter determines whether the highest measure of match is less than a termination value.

5. The system of claim 2, wherein the counter determines the interaction filter for a first unselected object of the identified objects based on the embedding of the question, the embedded object corresponding to the first identified object, the embedded object corresponding to the first unselected object, and overlaps between the bounding boxes of the first identified object and the first unselected object.

6. The system of claim 1, wherein the counter generates the count based on a weighted sum of the scores.

7. The system of claim 1, wherein the question is a natural language question.

8. A method comprising:
receiving, by a digital image processor, an image;
identifying, by the digital image processor, objects in an image;
embedding, by the digital image processor, the identified objects into an embedding space;
identifying, by the digital image processor, a bounding box for each of the identified objects;
receiving, by a language processor, a question;
mapping, by the language processor, the question into the embedding space;
determining, by a scorer, scores for the identified objects, each respective score determining how well a corresponding one of the identified objects is responsive to the question;
determining, by a counter, a count of the objects in the image that are responsive to the question based on the scores; and
outputting the count and the bounding box for each object included in the count.

9. The method of claim 8, wherein determining the count comprises:
determining whether to add a first identified object to the count;
iteratively applying an interaction filter to remaining identified objects to determine an uncounted object that is most likely responsive to the question based on each previously counted object;
with each iteration, determining whether to add said uncounted object to the count; and
determining when to terminate counting objects in the image.

10. The method of claim 9, wherein determining the first identified object to count comprises identifying which of the identified objects has a highest measure of match to the embedding of the question.

11. The method of claim 10, wherein determining when to terminate processing objects in the image comprises determining whether the highest measure of match is less than a termination value.

12. The method of claim 9, further comprising determining the interaction filter for a first unselected object of the identified objects based on the embedding of the question, the embedding corresponding to the first identified object, the embedding corresponding to the first unselected object, and overlaps between the bounding box of the first identified object and the bounding box of the first unselected object.

13. The method of claim 8, wherein generating the count comprises determining a weighted sum of the scores.

14. The method of claim 8, wherein the question is a natural language question.

15. A counter comprising:
a logits module that initializes logit values for each of a plurality of candidate objects based on a scoring vector from a scorer, the scoring vector encoding how well a plurality of candidate objects in an image match criteria in a question, each logit value indicating how likely a corresponding candidate object is to be counted;
an object selector that selects a first object from the candidate objects that has a highest logit value and counts the first object; and
an interaction module that provides updates to the logit values based on the selection of the first object by the object selector.

16. The counter of claim 15, wherein:
the object selector further iteratively selects one or more additional objects from the candidate objects based on their logit values;
the interaction module further provides updates to the logit values with the selection of each of the one or more additional objects; and
the object selector stops iteratively selecting the one or more additional objects when logit values of each of the candidate objects is less than a termination value.

17. The counter of claim 16, wherein the termination value is trainable.

18. The counter of claim 15, further comprising:
a weighting unit that receives the scoring vector from the scorer and applies trainable weights to each score in the scoring vector;
a summing unit that adds a trainable bias to the weighted scoring vector;
a transfer function that is applied to an output of the summing unit and generates initial logits values for the logits module.

19. The counter of claim 15, wherein the interaction module determines an update to a first logit value of a first unselected object based on an embedding of the question, an object embedding corresponding to the first object, an object embedding corresponding to the first unselected object, and overlaps between bounding boxes of the first object and the first unselected object.

20. The counter of claim 15, wherein the object selector further outputs a bounding box correspond to the first object.

* * * * *